(12) United States Patent
Manczak et al.

(10) Patent No.: US 7,536,693 B1
(45) Date of Patent: May 19, 2009

(54) METHOD FOR LOAD SPREADING OF REQUESTS IN A DISTRIBUTED DATA STORAGE SYSTEM

(75) Inventors: Olaf Manczak, Hayward, CA (US); Michael Goff, San Francisco, CA (US); Patrick Gates, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 934 days.

(21) Appl. No.: 10/883,321

(22) Filed: Jun. 30, 2004

(51) Int. Cl.
*G06F 9/50* (2006.01)
*G06F 15/16* (2006.01)
*G06F 15/173* (2006.01)

(52) U.S. Cl. .................. 718/105; 709/226
(58) Field of Classification Search .............. 718/105; 709/226
See application file for complete search history.

(56) References Cited

U.S. PATENT DOCUMENTS

| | | | |
|---|---|---|---|
| 5,640,286 A | 6/1997 | Acosta et al. | 360/48 |
| 5,689,727 A | 11/1997 | Bonke et al. | 710/20 |
| 6,108,703 A | 8/2000 | Leighton et al. | 709/226 |
| 6,182,121 B1 | 1/2001 | Wlaschin | 709/215 |
| 6,185,601 B1 | 2/2001 | Wolff | 709/203 |
| 6,230,200 B1 | 5/2001 | Forecast et al. | 709/226 |
| 6,252,878 B1 | 6/2001 | Locklear, Jr. et al. | 370/401 |
| 6,262,976 B1 | 7/2001 | McNamara | 370/254 |
| 6,272,136 B1 | 8/2001 | Lin et al. | 370/392 |
| 6,272,522 B1 | 8/2001 | Lin et al. | 709/200 |
| 6,295,564 B1 | 9/2001 | Shigetomi et al. | 710/74 |
| 6,424,621 B1 | 7/2002 | Ramaswamy et al. | 370/230 |
| 6,496,883 B2 | 12/2002 | Shigetomi et al. | 710/74 |
| 6,557,076 B1 | 4/2003 | Copeland et al. | 711/744 |
| 6,567,905 B2 | 5/2003 | Otis | 711/170 |
| 6,725,392 B1 | 4/2004 | Frey et al. | 714/6 |
| 6,742,137 B1 | 5/2004 | Frey, Jr. | 714/6 |
| 6,862,692 B2 | 3/2005 | Ulrich et al. | 714/6 |
| 6,865,655 B1 | 3/2005 | Andersen | 711/162 |
| 6,968,479 B2 | 11/2005 | Wyatt et al. | 714/53 |
| 6,996,501 B1 | 2/2006 | Rothberg | 702/186 |
| 7,024,582 B2 | 4/2006 | Loy et al. | 714/4 |
| 7,117,201 B2 | 10/2006 | Kuno et al. | 707/3 |

(Continued)

OTHER PUBLICATIONS

Anderson et al., "Robust Distributed Storage Using Erasure Codes", Dec. 5, 2002, pp. 1-10 [online]. Retrieved from the Internet: pdos.csail.mit.edu/6.824-2002/projects/erasure.ps>.

(Continued)

*Primary Examiner*—Li B Zhen
(74) *Attorney, Agent, or Firm*—Gunnison, McKay & Hodgson, L.L.P.; Philip J. McKay

(57) ABSTRACT

Incoming requests to a data storage system are distributed among one or more peer node computer systems of the data storage system in accordance with a load spreading configuration. A hash value is computed from the request utilizing selected header information of the request. The hash value is utilized in selecting a peer node computer system to receive the request in accordance with the load spreading configuration, and the request is redirected to the selected peer node computer system. In one embodiment, the load spreading configuration is implemented at a layer 2 switch and the load spreading configuration is reconfigurable by a peer node computer system of the data storage system.

12 Claims, 9 Drawing Sheets

U.S. PATENT DOCUMENTS

| | | | | |
|---|---|---|---|---|
| 7,155,464 | B2 | 12/2006 | Belov | 707/204 |
| 7,162,575 | B2 | 1/2007 | Dalal et al. | 711/112 |
| 7,203,871 | B2 | 4/2007 | Turner et al. | 714/710 |
| 7,266,716 | B2 | 9/2007 | Frolund et al. | 714/6 |
| 7,272,613 | B2 | 9/2007 | Sim et al. | 707/102 |
| 7,287,180 | B1 | 10/2007 | Chen et al. | 714/4 |
| 2002/0133491 | A1* | 9/2002 | Sim et al. | 707/10 |
| 2002/0152310 | A1* | 10/2002 | Jain et al. | 709/226 |
| 2002/0166026 | A1 | 11/2002 | Ulrich et al. | 711/114 |
| 2003/0009563 | A1 | 1/2003 | Douglis et al. | 709/227 |
| 2003/0078996 | A1 | 4/2003 | Baldwin | 709/220 |
| 2003/0188097 | A1 | 10/2003 | Holland et al. | 711/114 |
| 2003/0237016 | A1 | 12/2003 | Johnson et al. | 714/4 |
| 2004/0003055 | A1 | 1/2004 | Holland et al. | 709/219 |
| 2004/0073582 | A1 | 4/2004 | Spiegel | 707/204 |
| 2004/0205110 | A1 | 10/2004 | Hinshaw | 709/201 |
| 2005/0108594 | A1 | 5/2005 | Menon et al. | 714/6 |
| 2005/0165662 | A1 | 7/2005 | Shigetomi et al. | 705/27 |
| 2005/0257083 | A1 | 11/2005 | Cousins | 714/6 |
| 2005/0273686 | A1 | 12/2005 | Turner et al. | 714/752 |
| 2005/0283645 | A1 | 12/2005 | Turner et al. | 714/4 |

OTHER PUBLICATIONS

Cohen et al., "Segmented Information Dispersal (SID) Data Layouts for Digital Video Servers", *IEEE Transactions on Knowledge and Data Engineering*, Jul./Aug. 2001, pp. 593-606, vol. 13, No. 4.

"192.168.1.100" (About.com), p. 1 [online]. Retrieved on Mar. 27, 2008. Retrieved from the Internet: compnetworking.about.com/od/workingwithipaddresses/g/192_168_1_100_d.htm>.

"How to configure the MultiNICA and IPMultiNIC agents", pp. 1-3 [online]. Retrieved on Mar. 27, 2008. Retrieved from the Internet: seer.support.veritas.com/docs/231480.htm.

"SHA-Secure Hash Algorithm", p. 1 [online]. Retrieved on Mar. 26, 2008. Retrieved from the Internet: ://foldoc.org/?SHA.

* cited by examiner

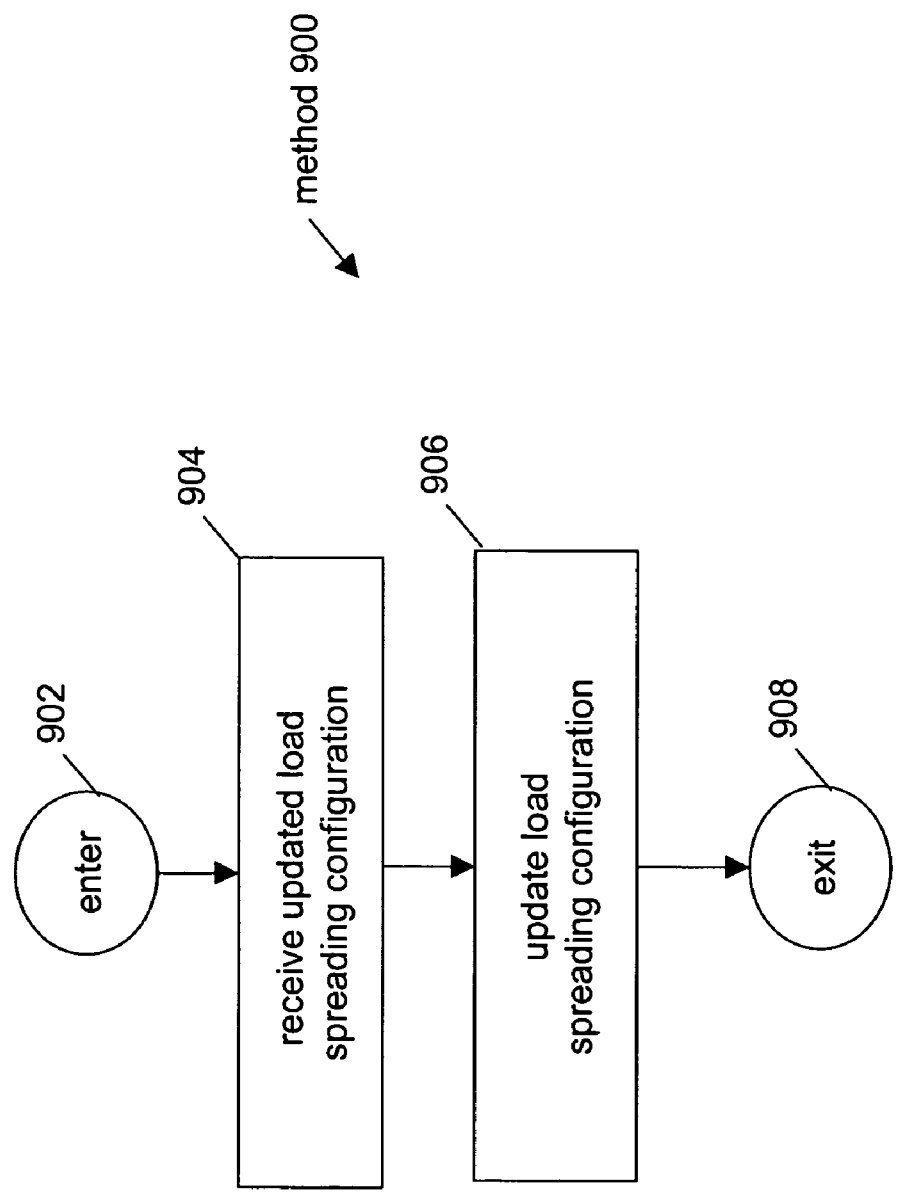

METHOD FOR LOAD SPREADING OF REQUESTS IN A DISTRIBUTED DATA STORAGE SYSTEM

BACKGROUND OF THE INVENTION

1. Field of the Invention

The present invention is directed to the field of data storage. In particular, the present invention is directed to the distribution of data traffic, such as requests, for processing by a distributed data storage system.

2. Description of Related Art

The quantity of fixed data content, such as text files and image files, is rising rapidly. For example, the Internet Archive WayBack Machine currently archives 30 billion web pages.

Further, compliance with stricter government regulations is requiring the storage of large amounts of selected data, such as securities and medical data, together with procedures for timely and verifiable retrieval of this data from the data storage system.

Due to rapidly increasing processor performance and disk storage size, data is increasingly stored on computer-based data storage systems, and, particularly, disk drives. However, while the storage capacity on disk drives has progressed rapidly, the ability to locate, access, and retrieve selected data has not progressed at the same rate. In particular, once selected data is located in a data storage system, the retrieval of the data is still limited by the performance of the disk head to write or read the data to or from the disk, as well as the bandwidth of the communication channels used to transfer the data into or out of the data storage system.

Prior art data storage systems primarily based the reliability of the data storage system on the hardware utilized by the system. Thus, many prior art storage systems often used highly configured data storage systems with costly hardware and inflexible architectures to attempt to manage the storage and retrieval of data in large data storage systems. If a component failed, a system administrator was often immediately notified to repair or replace the component to prevent failure of the system. Consequently, one or more system administrators were sometimes needed to maintain the hardware, and thus the reliability of the data storage system, or other level of quality of service.

Additionally, most prior art data storage systems permitted modification of data stored on the data storage system. Thus, to maintain coherent data, these prior art data storage systems often utilized lock managers that prevented concurrent modification of stored data. Disadvantageously, the lock managers often became a bottleneck in the data storage system.

Further, if a user desired to execute an application using data stored on a prior art data storage system, the data had to be located on the data storage system, transferred from the data storage system to the user's system, and then the application could be executed using the transferred data on the user's system. Where large amounts of data were requested, data transfer was often a lengthy process due to bandwidth limitations of the communications channels used to transfer the data. Additionally, once the user received the data, the user was limited to the processing capabilities of their computer system.

SUMMARY OF THE INVENTION

In accordance with one embodiment of the invention, a method for distributing incoming requests among one or more peer node computer systems of a distributed storage system includes: receiving a request at a network switch, the network switch including a load spreading configuration; determining whether the request is to be distributed to a peer node computer system in accordance with the load spreading configuration; upon a determination that the request is to be distributed to a peer node computer system in accordance with the load spreading configuration, computing a hash value from the request; determining a peer node computer system to receive the request in accordance with the load spreading configuration utilizing the hash value; and redirecting the request to the peer node computer system.

In accordance with another embodiment of the invention, a method for updating a load spreading configuration on a switch which distributes incoming requests among one or more peer node computer systems of a data storage system in accordance with the load spreading configuration includes: recognizing an update event at a peer node computer system; computing an updated load spreading-configuration at the peer node computer system; communicating the updated load spreading configuration from the peer node computer system to a network switch; and updating a load spreading configuration present on the network switch with the updated load spreading configuration.

BRIEF DESCRIPTION OF THE DRAWINGS

The accompanying drawings, which are incorporated in, and constitute a part of this specification, illustrate embodiments of the invention, and together with the description, serve to explain the invention. In the drawings, the same reference numbers are used to denote similar components in the various embodiments.

In the drawings:

FIG. 9 illustrates a process flow diagram of a method for updating a load spreading configuration by a switch in accordance with one embodiment of the invention.

DETAILED DESCRIPTION

Figure 1:
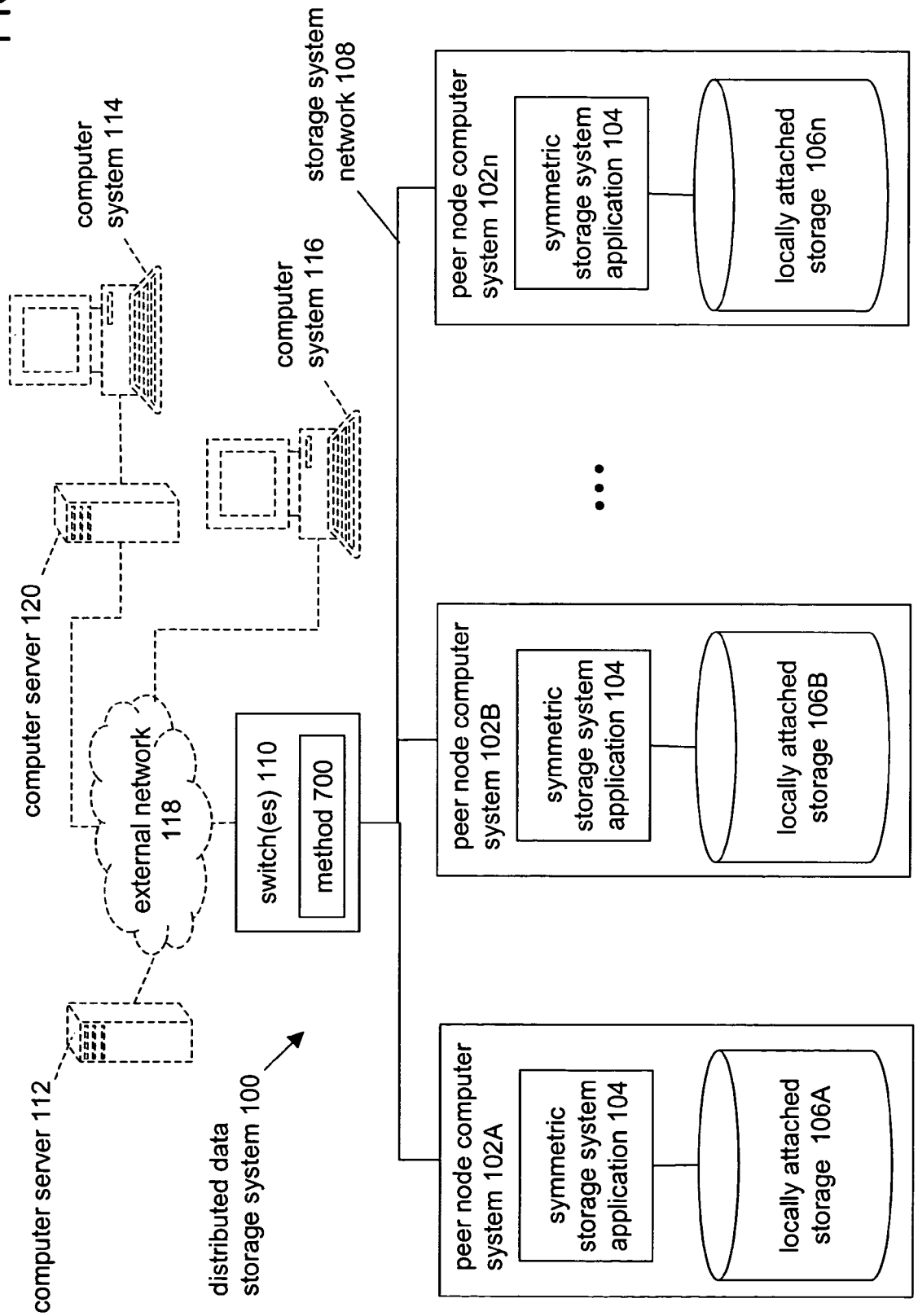
FIG. 1 illustrates a diagram of a distributed data storage system in accordance with one embodiment of the invention.

The invention will now be described in reference to the accompanying drawings. The same reference numbers may be used throughout the drawings and the following description to refer to the same or like parts.

Load balancing products and technologies are often utilized in distributed computer systems to provide an even allocation of tasks among the individual computer systems that make up the systems and to provide more efficient use of the systems' resources. Typically incoming network traffic, e.g., data packets, is redirected to individual computer systems according to static load balancing rules set on a director and/or switch.

In some distributed computer systems, devices termed directors are used to balance the distribution of tasks among the individual computer systems, such as individual servers. Generally, directors are devices that monitor a registered, i.e., externally programmed, set of servers and that distribute data packets among the individual servers. Directors generally have one external network interface and one internal network interface, and consequently are typically limited to a single network interface throughput. A program present in the director monitors the individual servers and determines how to distribute the data packets, e.g., load, to individual servers in accordance with a static set of load balancing rules.

To redirect data packets to particular servers, typically the director modifies the network addresses in the data packet headers, such as Ethernet addresses or IP addresses. Consequently, directors usually operate on data packet information at the layer 4 level of the Open Systems Interconnection (OSI) architecture.

In some other distributed computer systems, directors are integrated into network switches and used to balance loads among the individual servers. Network switches with integrated directors are typically similar to director devices, but include a plurality of external network interfaces, e.g., ports, to external clients and direct connects, e.g., ports, to the individual servers.

Network switches with integrated directors typically redirect data packets among ports to the individual servers by matching source and destination addresses in the header of the data packet against tables which tie addresses to ports. Generally the switch chipsets used in the network switches with integrated directors are designed to perform these operations concurrently on all the ports at wire speed, i.e., substantially as fast as the data packets can be sent over the network.

Similar to directors, network switches with integrated directors generally redirect data packets by modifying data packet addresses at the layer 4 level, while some simply forward data packets without modifying the addresses. Network switches with integrated directors are typically capable of a higher throughput than a director, but usually the throughput is limited by the performance of the network switch processor that executes the static load balancing rules.

In still other distributed computer systems, one or more of the individual servers act as directors to redirect data packets to other individual servers in accordance with static load balancing rules and fast switches are used between the individual servers.

Figure 7:
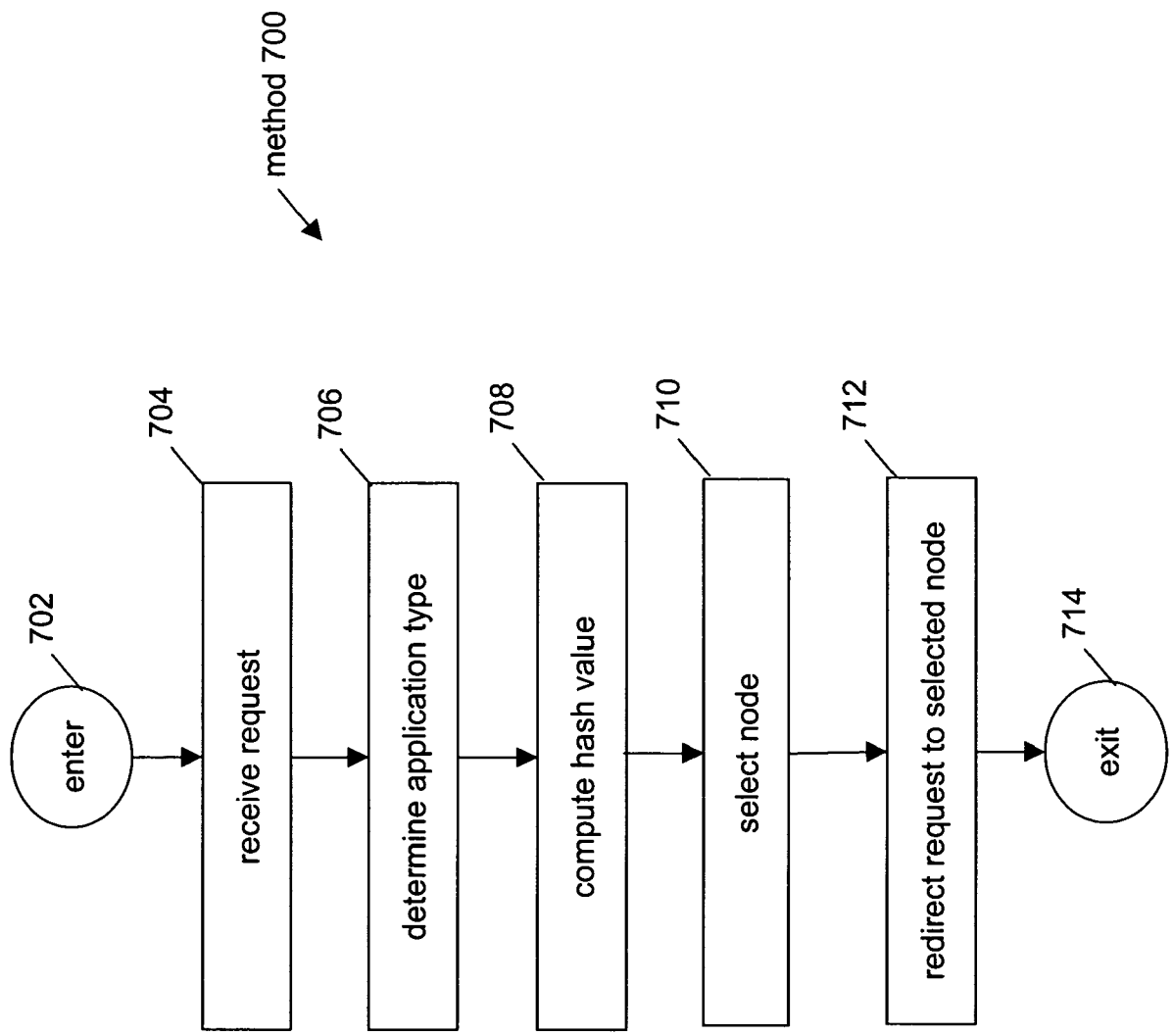
FIG. 7 illustrates a process flow diagram of a method for distributing an incoming request to a peer node computer system based on a load spreading configuration in accordance with one embodiment of the present invention.

Referring generally to FIG. 7, in one embodiment, a method for distributing an incoming request to a peer node computer system of a plurality peer node computer systems of a distributed storage system, such as a distributed data storage system 100 (FIG. 1), includes receiving a request at a switch, the switch including a load spreading configuration (operation 704). In one embodiment, the (data packet) header of the request includes at least a destination port address, a source IP address, and a source port address. Based upon the application type of the request, a determination is made whether the request is to be distributed to a peer node computer system in accordance with the load spreading configuration (operation 706).

If it is determined that the request is to be distributed to a peer node computer system in accordance with the load spreading configuration, a hash value is computed using information from the request (operation 708). In one embodiment, the hash value is computed using the source IP address and the source port address, such as an X number of least significant bits of the source IP address and a Y number of least significant bits of the source port address. A peer node computer system is selected to receive the request in accordance with the load spreading configuration based on the hash value (operation 710), and the request is redirected to the selected peer node computer system (operation 712). In one embodiment, the load spreading configuration is reconfigurable on the switch from a peer node computer system utilizing one or more load spreading control application program interfaces (APIs).

FIG. 1 illustrates a diagram of a distributed data storage system 100 in accordance with one embodiment of the invention. As illustrated, in one embodiment, distributed data storage system 100, hereinafter referred to as storage system 100, includes a plurality of peer node computer systems 102A-102n, hereinafter referred to as nodes 102A-102n, interconnected by a storage system network 108. In one embodiment, each node 102A-102n includes a network protocol interface that allows data objects to be stored, retrieved, and operated on in storage system 100 through any of nodes 102A-102n. Further, in one embodiment, each node 102A-102n is assigned a different IP address.

In the present embodiment, each node 102A-102n includes a symmetric storage system application 104 connected to locally attached storage 106A-106n, respectively. For example symmetric storage system application 104 is connected to locally attached storage 106A in node 102A. In storage system 100, symmetric storage system application 104 is symmetric, i.e., the same, across all of nodes 102A-102n, however, the hardware components that make up each node 102A-102n, for example, locally attached storage 106A, need not be symmetric.

Each node 102A-102n is a complete compute and storage unit and includes all the software required to run storage system 100. In one embodiment, the group of one or more nodes 102A-102n, for example sixteen nodes, is termed a cell, and management of the cell is by any of nodes 102A-102n (at any one time), herein termed a master node. In one embodiment, selection of a master node is determined using an election process. Election processes are well known to those of skill in the art and are not further described herein for clarity of description of the present invention.

In one embodiment, each node 102A-102n provides status information over storage system network 108 that is received by the other nodes and used to build and maintain individual views of the cell, herein termed a cell view. In one embodiment, a cell view includes information about whether a node 102A-102n is active and available for storage of data and about which node 102A-102n is the master node. In other embodiments, the status information provided by each node 102A-102n and the cell view includes additional information, such as the availability of individual storage structures in each locally attached storage 106A-106n, and data storage levels of each locally attached storage 106A-106n.

When a node failure is detected in the cell view, each affected node 102A-102n in storage system 100 independently starts a recovery process to reconstruct data stored on the failed node or on a locally attached storage allowing distributed and balanced recovery of data in which the storage reliability of a data object is maintained.

In FIG. 1, some of nodes 102A-102n can be active and available, herein termed on-line, while some others of nodes 102A-102n may not be actively available, herein termed off-line. Any of nodes 102A-102n can be selectively brought on-line or taken off-line in storage system 100 as needed. In the present description, a node 102A-102n is assumed to be on-line and available unless otherwise specified.

In one embodiment, each of nodes 102A-102n is a field replaceable unit (FRU). In one embodiment, when a new node is added to storage system 100, the new node is automatically recognized by storage system 100 and any needed applications, such as symmetric storage system application 104, is automatically loaded on to the new node from one of nodes 102A-102n. The new node is then registered with storage system 100, any needed formatting is performed, and any data transfer to the new node occurs.

Data is stored on storage system 100 as data objects. Herein a data object is data of a finite length that is separately identifiable from other data objects and is transferable to storage system 100, for example, a text file, an image file, or a program file, among others. In one embodiment, a layout map ID is generated and associated with a data object. The layout map ID is used to generate a layout map for distributed placement of the data object on storage system 100. A unique object identifier (ID) is generated based on an intrinsic property of the data object, such as the content of the data object, which identifies the data object and provides content addressability for the data object. The data object is divided into data fragments to permit distributed placement of the data object on storage system 100.

During fragmentation of a data object, parity fragments are also generated in accordance with external criteria, such as a desired reliability of storage. The data fragments and the parity fragments are distributively stored on storage system 100 in accordance with the layout map and associated with the unique object ID.

System metadata is also generated during fragmentation of a data object, and at least a portion of this system metadata is stored with each data fragment and parity fragment and is used to reconstruct the data object. Metadata generated from other sources, termed extended metadata, can also be associated with a data object. Thus, although a data object has a single object ID, several metadata can be associated with the object ID.

In one embodiment, a unique metadata object identifier (ID) is generated for each metadata associated with a data object. In one embodiment, selected metadata are indexed and stored in one or more metadata caches to provide enhanced searching and retrieval of data objects on storage system 100.

In one embodiment, storage system 100 includes mechanisms for uploading an application, herein termed a disklet, onto storage system 100 and executing the disklet on storage system 100 using data objects that are being written to, being read from, or are stored on storage system 100.

In the present embodiment, access to storage system 100, and, in particular, to nodes 102A-102n, is via a switch 110. In some embodiments, one or more switches 110 are utilized, for example, to provide redundancy or back-up in the event of failure of a switch 110.

In one embodiment, switch 110 is configured to support communications on two networks: an external network for external traffic between storage system 100 and external clients, such as computer servers 112 and 120, and computer system 116 on external network 118; and an internal network, i.e., storage system network 108, for internal traffic between nodes 102A-102n.

In one embodiment, switch 110 is configured to present two IP addresses to the external network: a virtual IP address for client access to storage system 100; and, an administrative IP address used to access both switch 110 and a node 102A-102n designated as the master node. The administrative IP address is further used to permit administration of storage system 100, such as by a system administrator, for example on computer system 114. In this embodiment, although each of nodes 102A-102n has an associated IP address, nodes 102A-102n are abstracted from clients on the external network, allowing nodes 102A-102n, to be viewed as a single entity.

Requests, such as store and retrieve requests, received by switch 110 are sent to a node 102A-102n in storage system 100 in accordance with a load spreading configuration implemented by switch 110, such as implemented by a switching table of switch 110. In one embodiment, the load spreading configuration is periodically updated, e.g., reconfigured, by one or more of nodes 102A-102n to dynamically effect a desired load spreading on storage system 100. One embodiment of a method of load spreading implemented by switch 110 is further described herein with reference to FIGS. 7-9.

In an alternative embodiment, rather than switch 110 presenting a single IP address to external clients, each node 102A-102n presents its assigned IP address to the external network via switch 110, and, rather than load spreading occurring at switch 110, a basic load spreading mechanism is included with a client API (resident at the client) in order to spread the load among nodes 102A-102n. In one embodiment, a listing of nodes 102A-102n is passed to the client API in order to effect the load spreading.

Figure 2:
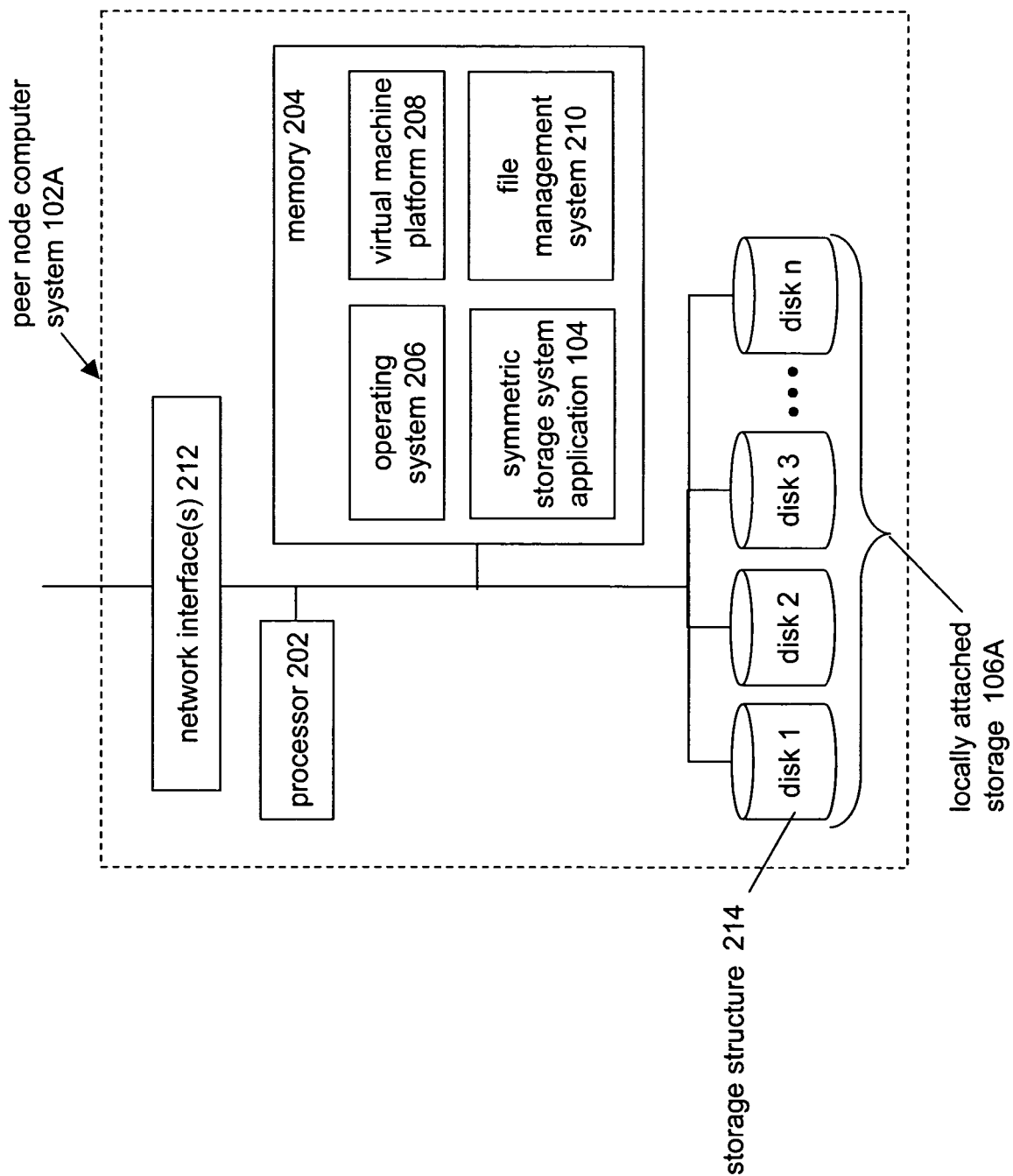
FIG. 2 illustrates one example of a peer node computer system in accordance with one embodiment of the invention.

FIG. 2 illustrates one example of peer node computer system 102A in accordance with one embodiment of the invention. Although the present embodiment is described with reference to peer node computer system 102A, herein node 102A, the description is applicable to any of nodes 102A-102n. It is to be understood that the present example is exemplary, and that other configurations and hardware are possible, in particular, locally attached storage 106A can be formed of fewer or greater numbers of storage structures, e.g., disk 1-disk n, and with individually different storage capacities.

In FIG. 2, in one embodiment, node 102A includes one or more network interface(s) 212 which provide connectivity to network 108 (including switch(es) 110). In embodiments where one or more switch(es) 110 are present in storage system 100, one or more corresponding network interface(s) 212 can be utilized on node 102A.

In the present embodiment, node 102A further includes: a processor 202; a memory 204; an operating system 206; a virtual machine platform 208; a file management system 210; symmetric storage system application 104; and locally attached storage 106A. In one embodiment, locally attached storage 106A includes one or more storage structures 214, such as a finite number of disks 1-n, for example, four disks.

In the present embodiment, node 102A is organized to be an ergonomically acceptable field replaceable unit (FRU), for example, in one embodiment, a 1U form factor FRU.

Figure 3:
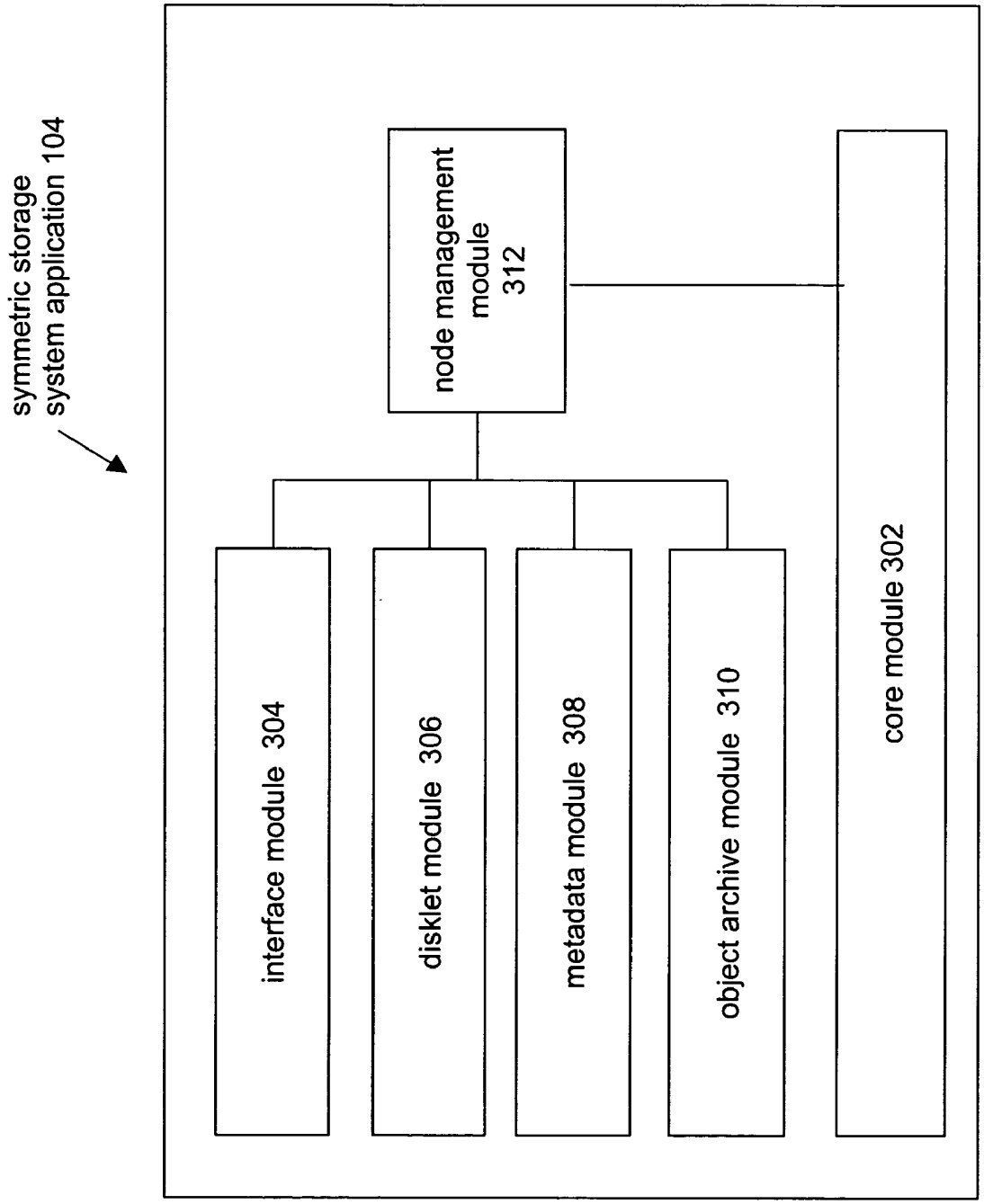
FIG. 3 illustrates a functional block diagram of a symmetric storage system application in accordance with one embodiment of the invention.

FIG. 3 illustrates a functional block diagram of symmetric storage system application 104 of node 102A in accordance with one embodiment of the invention. As illustrated in FIG. 3, in one embodiment, symmetric storage system application 104 includes: a core module 302; an interface module 304; a disklet module 306; a metadata module 308; an object archive module 310; and, a node management module 312.

In one embodiment, node management module 312 controls modules 302, 304, 306, 308, and 310 of symmetric storage system application 104, and, controls storage system 100 in instances when node 102A is the master node. Node management module 312 generates and maintains an overall view of storage system 100, herein termed a cell view, that includes information about nodes 102A-102n present in the cell and about which node is the currently acting master node.

Based on changes to the cell view, node management module 312 can independently start a recovery process to reconstruct data stored on a failed node 102B-102n or stored on a failed storage structure of locally attached storage device 106A.

In the present embodiment, node management module 312 includes a monitoring function and a management function. Node management module 312 monitors modules 302, 304, 306, 308, and 310 to gather information about the operational status of node 102A and storage system 100.

Node management module 312 has hooks, i.e., communication links, into interface module 304, disklet module 306, metadata module 308, and object archive module 310 to monitor each module in node 102A. Node management module 312 also communicates with core module 302 and monitors core module 302 for any events, such as error codes generated during the monitoring of the hardware. In the event core module 302 does not have the capability to perform hardware monitoring and event generation, node management module 312 includes mechanisms that permit it to assume these functions.

The monitoring function of node management module 312 generates events, as needed, that the management function acts on. The management function of node management module 312 includes response strategies for responding to different events, such as error codes, and executes the response strategies based on the event, for example, harvesting data, and rebooting a node, among others.

In one embodiment, the monitoring of modules 302, 304, 306, 308 and 310 is implemented using a near stateless communication process termed a shared mailbox, also conventionally termed a distributed mailbox, hints, or heartbeats. In shared mailbox communications each module 302, 304, 306, 308, 310, and 312 sends a "heartbeat" that indicates its status at a designated interval or time. Each module 302, 304, 306, 308, 310, and 312 does not have to be individually queried as to its status, but rather the "heartbeats" are monitored for any changes that require a response to be generated. Thus, each module 302, 304, 306, 308, and 310 is generally able to maintain its status without having to lock on to any particular process to provide its status. In one embodiment, the "heartbeat" of node management module 312 is monitored by a node management module of another node. For example, the "heartbeat" of node management module 312 in node 102A is monitored by a node management module in node 102B.

As earlier described, node management module 312 communicates with core module 302 and monitors core module 302 for any events, such as error codes generated during the monitoring of the hardware. In one embodiment, core module 302 includes information about the hardware of node 102A, such as the number, types, and layout of disks, the number and types of communication channels, processor 202, and network interface(s) 212. In one embodiment, core module 302 includes mechanisms to check the hardware of node 102A for errors, such as disk errors, and to generate events for communication to node management module 312. In the event core module 302 cannot check the hardware of node 102A, node management module 312 includes mechanisms to assume these functions.

Core module 302 also includes information about the operating system and other applications utilized on storage system 100 on node 102A. For example, referring to node 102A (FIG. 2), core module 302 includes information about operating system 206, virtual machine platform 208, and file management system 210. In some embodiments, core module 302 monitors operating system 206, virtual machine platform 208, and file management system 210.

Additionally, core module 302 includes a series of drivers that allow instructions to be passed between symmetric storage system application 104 and the hardware of node 102A.

In one embodiment, interface module 304 provides an internet protocol and overarching application program interface (API) to access storage system 100. In one embodiment, the internet protocol is Hypertext Transfer Protocol (HTTP), however in other embodiments, other protocols can be used. In one embodiment, the API is a Java® API, however in other embodiments, other APIs can be used.

Interface module 304 receives requests to store, e.g., write, read, and operate on data on storage system 100. Interface module 304 receives any metadata provided with data to be stored on storage system 100. Interface module 304 also receives disklets for storage and execution on storage system 100.

In one embodiment, disklet module 306 manages disklets' stored and executing on storage system 100. A disklet is code, e.g., an application, written by a user against a disklet API, such as a Java® API, for storage and execution on storage system 100. In one embodiment, the disklet is precompiled code, such as Java® byte code. In one embodiment, a disklet is developed on a user's system, such as computer systems 114 or 116, and uploaded to storage system 100.

The disklet is stored on storage system 100 and a handle to the disklet is generated by disklet module 306 and returned to the user. The user uses the handle in a request to execute the disklet using data that is stored on, being read from, or being written to storage system 100. Thus, a disklet is executed on storage system 100 and the results returned to the user (if so desired). Thus, data does not have to first be retrieved and transferred to the user in order to execute the application.

In one embodiment, disklet module 306 also implements disklet security to prevent disklets from inadvertently or maliciously damaging storage system 100. In one embodiment, Java® sand boxing is used to set limits on what operations a disklet can perform and to externally limit the amount of processing and memory a disklet can consume.

In one embodiment, a new disklet is first read by a security application of disklet module 306 that determines whether the disklet is approved for use on storage system 100. In one embodiment, an approved disklet is identified as approved, e.g., signed, and allowed to be used on storage system 100. A non-approved disklet is not identified as approved, e.g., not signed, and can be deleted, quarantined, or processed for further security evaluation. In some embodiments, a notification is generated advising a user that a disklet is not approved.

In one embodiment, object archive module 310 distributively stores, retrieves, and reconstructs data objects in storage system 100. Retrieval and reconstruction of data objects in storage system 100 is based upon the mechanism of storage implemented by object archive module 310.

In storing a data object, object archive module 310 determines placement, fragmentation, and storage of a data object. During placement, object archive module 310 receives a data object and determines a set of storage structures, such as storage disks, to be used in distributively storing fragments of the data object, including data fragments and parity fragments.

In one embodiment, object archive module 310 generates a random, and reproducible, layout map identifier (ID) that is assigned to the data object. While non-random layout map IDs may be used, assignment of randomized layout map IDs allows data objects to be evenly distributed among storage structures of locally attached storage 106A-106n in storage system 100, even if some of nodes 102A-102n are removed or added.

The layout map ID is used to generate a layout map which represents possible distributed layouts for that data object in storage system 100 based on the current availability of storage structures, for example storage disks, in locally attached storage 106A-106n. In one embodiment, object archive 310 maintains a current view of the available storage structures in storage system 100, herein termed a disk mask, for use in generating layout maps. In one embodiment, a layout map indicates an initial distribution, or initial layout, of fragments for a data object in selected storage structures of one or more of locally attached storage 106A-106n, as well as alternative locations for fragments, such as when a storage structure in the initial layout fails or otherwise becomes unavailable or when a previously unavailable storage structure becomes available.

Figure 4:
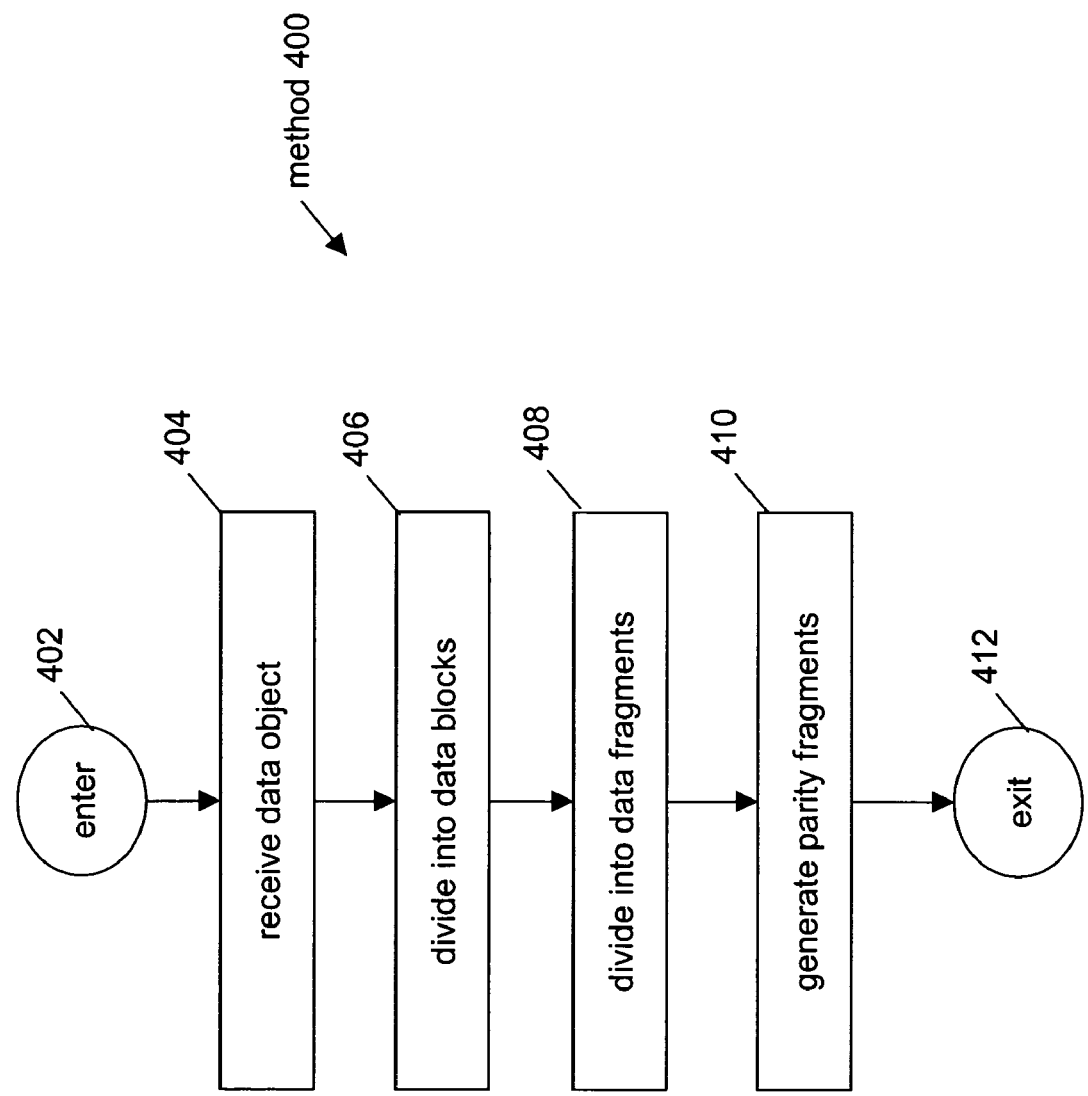
FIG. 4 illustrates a process flow diagram of a method for dividing a data object into data fragments with the generation of parity fragments in accordance with one embodiment of the invention.
Figure 5:
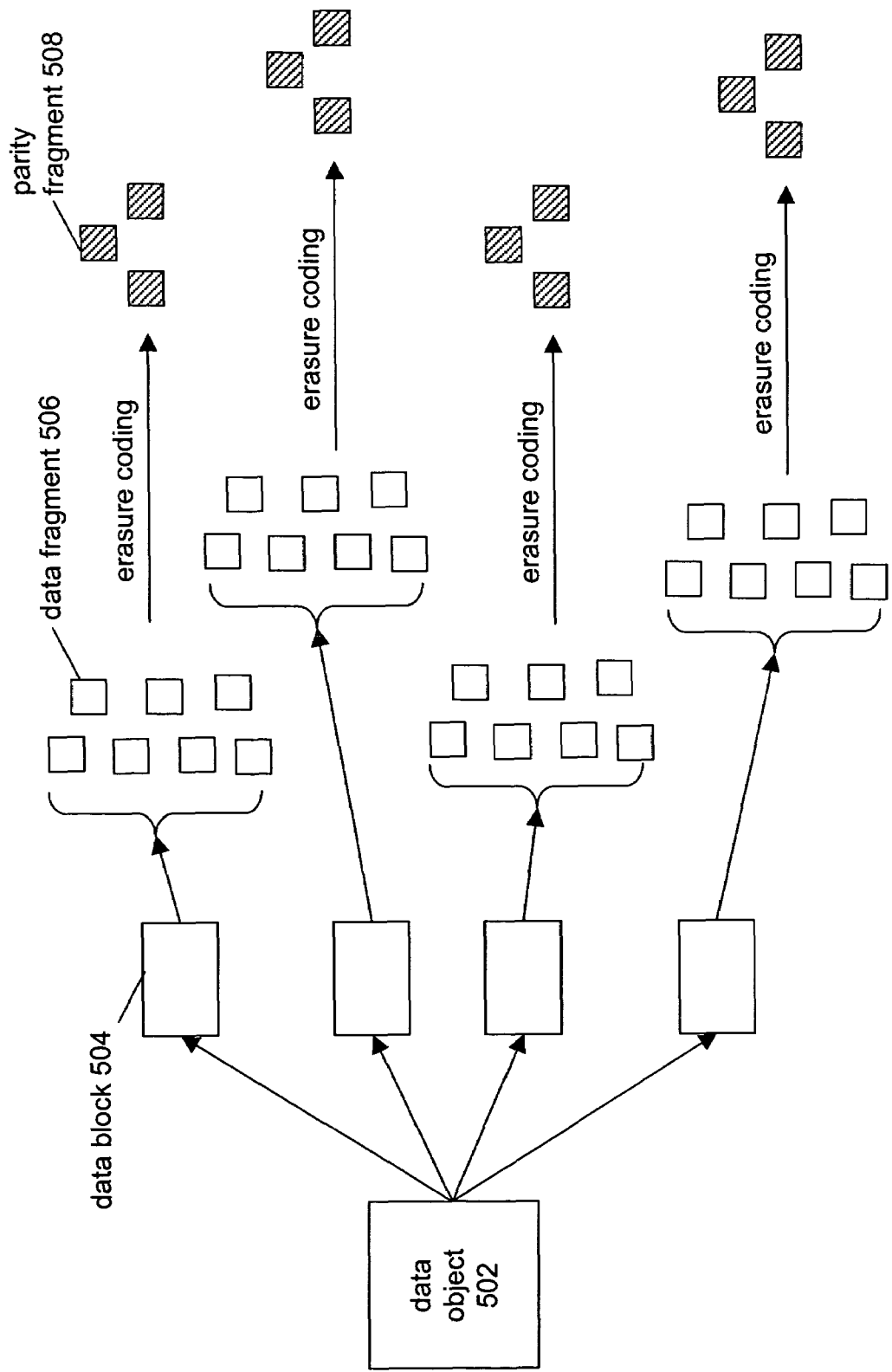
FIG. 5 illustrates the method of FIG. 4 in accordance with one embodiment of the invention.

In fragmentation of a data object, in one embodiment, object archive module 310 divides the data object into data fragments and further generates parity fragments as further described herein with reference to FIGS. 4 and 5.

FIG. 4 illustrates a process flow diagram of a method 400 for dividing a data object into data fragments with the generation of parity fragments in accordance with one embodiment of the invention. FIG. 5 illustrates method 400 in accordance with one embodiment of the invention. In one embodiment, method 400 (FIG. 4) is implemented by object archive module 310 (FIG. 3) of symmetric storage system application 104 (FIG. 2). Referring initially to FIG. 4, in one embodiment, from an ENTER operation 402, flow transfers to a RECEIVE DATA OBJECT operation 404.

In RECEIVE DATA OBJECT operation 404, referring now to FIGS. 3, 4, and 5, object archive module 310 receives a data object 502 for storage in storage system 100 (FIG. 1). In one embodiment, object archive module 310 generates a unique object identifier (ID) for the data object. In one embodiment, the object ID is generated based upon an intrinsic property of the data object. In one embodiment, the object ID is generated based upon the content of the data object.

In one embodiment, object archive module 310 generates the object ID for data object 502 using an SHA-1 hash of the data object contents. In other embodiments, the object ID can be generated based upon other intrinsic properties of the data object that result in a unique object ID. Uniquely identifying a data object based on its content or other intrinsic property of the data object, enables the unique identifier, e.g., the object ID, to be used as an identifier of the data object in storage system 100 and provides content addressability. Upon receipt of data object 502 and generation of the object ID, flow transitions from RECEIVE DATA OBJECT operation 404 to a DIVIDE INTO DATA BLOCKS operation 406.

In DIVIDE INTO DATA BLOCKS operation 406, object archive module 310 divides data object 502 into one or more data blocks 504. Herein a data block is a portion of a data object, such as a logical data size that operating system 206 uses to read or write files, for example, 386 KB. In one embodiment, based on the object ID, any of data blocks 504 can be distributed to any of the other nodes 102B-102n in storage system 100 and the remainder of method 400 performed at those other nodes 102B-102n. Upon division of data object 502 into data blocks 504, flow transitions from DIVIDE INTO DATA BLOCKS operation 406 to a DIVIDE INTO DATA FRAGMENTS operation 408.

In DIVIDE INTO DATA FRAGMENTS operation 408, object archive module 310 divides each of data blocks 504 into one or more data fragments 506. Herein a data fragment is a portion of a data block, such as 64 KB on disk. Upon division of each of data blocks 504 into data fragments 506, flow transitions from DIVIDE INTO DATA FRAGMENTS operation 408 to a GENERATE PARITY FRAGMENTS operation 410.

In GENERATE PARITY FRAGMENTS operation 410, object archive module 310 applies an erasure coding algorithm, such as a Reed-Solomon erasure coding algorithm, to data fragments 506 from each of data blocks 504 to generate one or more parity fragments 508. In one embodiment, any parity fragment 508 can be used to generate any data fragment 506 of data block 504 of data object 502. In one embodiment, the erasure coding algorithm utilizes an external criterion, such as a desired reliability of storage, in generating parity fragments 508. Upon generation of parity fragments 508, flow transitions from GENERATE PARITY FRAGMENTS operation 410 and exits method 400 at an EXIT operation 412.

In an alternative embodiment, object archive module 310 divides data object 502 directly into data fragments 506 and the erasure coding algorithm is applied to data fragments 506 to generate parity fragments 508, e.g., operation 406 is not performed. Although division of data object 502 into data blocks 504 is not a required intermediate operation to division of data object 502 into fragments 506, it enables parallelization of operations 408 and 410 by enabling data blocks 504 to be distributed to other nodes 102B-102n where the generation of data fragments 506 and parity fragments 508 can occur.

Following generation of the data fragments and parity fragments (method 400), object archive module 310 stores the data fragments of the data object and the parity fragments associated with the data object to one or more storage structures, e.g., storage disks, in storage system 100, in accordance with the layout map associated with the data object. In one embodiment, object archive 310 periodically evaluates the storage structures in locally attached storage 106A, for example by checking disk segments of disks, and reporting problems to node management module 312 (FIG. 3).

During placement, fragmentation, and storage of a data object, object archive module 310 also generates metadata associated with the data object. Metadata is data that provides a description of a data object stored in storage system 100, and is used to perform searches and retrieve data in storage system 100. In particular, object archive module 310 generates system metadata which is metadata that is stored, e.g., encapsulated, as part of each of the data fragments and parity fragments of that data object.

In one embodiment, system metadata includes information that is utilized by object archive module 310 to retrieve and reconstruct a data object once a data fragment of that data object is located. Examples of system metadata include number of data fragments, number of parity fragments, the layout for a data object, the data fragment length, the size of a data object, and the create time for a data object. System metadata generated by object archive module 310 are also provided to metadata module 308.

In one embodiment, metadata module 308 receives metadata from metadata generators, such as an object archive, e.g., object archive module 310, a client, e.g., a client application program interface (API), or a disklet, e.g., an executing disklet. In one embodiment, as earlier described with reference to object archive module 310, metadata received from object archive module 310 is termed system metadata. Other metadata, such as metadata received from a client or generated in accordance with disklet, is termed extended metadata.

Extended metadata received by metadata module 308 is passed to object archive 310 for distributed storage on storage system 100. In one embodiment, metadata module 308 computes a deterministic layout map identifier, herein termed a metadata layout map ID, and provides the metadata layout map ID to object archive module 310.

Object archive module 310 determines the placement of the metadata based on the metadata map ID. In one embodiment, object archive module 310 uses the metadata layout map ID to generate a metadata layout map for storing the metadata. Object archive module 310 fragments the metadata similar to a data object as earlier described with reference to FIGS. 4 and 5 with resultant metadata data fragments and metadata parity fragments. Following generation of the metadata data fragments and metadata parity fragments, object archive module 310 stores the metadata data fragments and the metadata parity fragments to one or more storage structures, e.g., disks, in storage system 100, in accordance with the metadata layout map.

In one embodiment, metadata module 308 further indexes selected metadata, e.g., selected from the system metadata and/or extended metadata, into one or more metadata caches. In one embodiment, each metadata cache is a relational database of selected metadata. In one embodiment, each metadata cache is extensible.

The metadata caches are distributively stored on storage System 100 and used to enhance searching and retrieval of data objects on storage system-100, e.g., by searching the metadata caches rather than the object archive.

Figure 6:
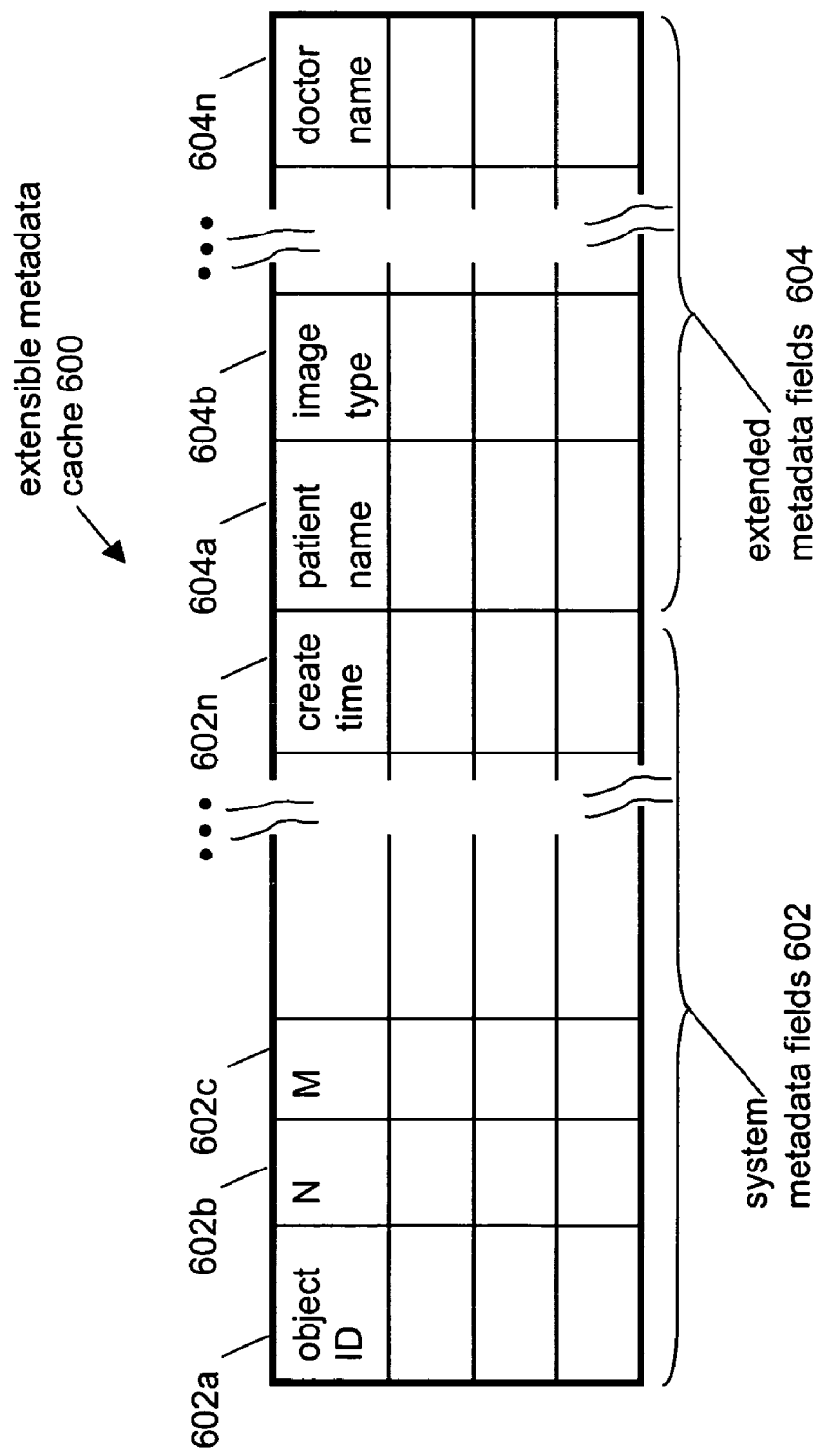
FIG. 6 illustrates a block diagram of an extensible metadata cache in accordance with one embodiment of the invention.

FIG. 6 illustrates a block diagram of an extensible metadata cache 600 in accordance with one embodiment of the invention. In FIG. 6, extensible metadata cache 600 includes system metadata fields 602, such as system metadata fields 602A-602n, and extended metadata fields 604, such as extended metadata fields 604A-604n. For example, system metadata fields 602A-602n can include: an object ID field 602A (an object ID of a data object); an "N" field 602B (number of data fragments); an "M" field 602C (number of parity fragments; and a size field 602n (size of a data object). Extended metadata fields 604A-604n, such as for those metadata generated in response to execution of a disklet on storage system 100, can include: a patient name field 604A; an image type field 604B; and a doctor name field 604n. In one embodiment, the number of extended metadata fields is definable by a system administrator of storage system 100.

In one embodiment, the metadata caches generated by metadata module 308 can be replicated on any of nodes 102A-102n to provide a desired reliability. The metadata caches are scalable with the size of storage system 100 and can be distributed across nodes 102A-102n. In some embodiments, metadata module 308 can further generate metadata caches associated with selected parameters of a data object, such as a type of data object, or with a particular metadata generator.

As earlier described, in one embodiment, switch 110 presents a single VIP address that allows storage system 100 to be viewed as a single entity to an external client, e.g., an external computer system/server. Client discovery and data transfer are implemented utilizing the single cell VIP, and the individual nodes 102A-102n of the cell are not visible to the client. Client data traffic, e.g., requests, entering storage system 100 and destined for the cell VIP are redirected to the appropriate node 102A-102n in the cell based on a load spreading configuration stored on and implemented by switch 110.

In one embodiment, to ensure that external clients cannot access internal data on storage system 100 and to isolate nodes 102A-102n from external clients, switch 110 is configured to support two port-based VLANs: an external VLAN for communication between external clients and nodes 102A-102n (including uplink switch ports); and an internal VLAN for communication between nodes 102A-102n. In the present embodiment, a specified number of switch ports on switch 110 are reserved for uplink traffic to external clients on the external network, and at least n number of switch ports are reserved for nodes 102A-102n.

In one embodiment, the switch ports used to attach nodes 102A-102n belong to both VLANs (external and internal). The switch ports used to connect nodes 102A-102n to external clients belong to the external VLAN only. In one embodiment, switch 110 forwards data packets from the external VLAN as tagged and from the internal VLAN untagged. Thus, data packets exchanged between nodes 102A-102n on the internal VLAN are not visible to external clients, and nodes 102A-102n can reliably distinguish data packets from external clients from data packets from other nodes. This isolates internal network traffic between nodes 102A-102n from the external network in a single switching fabric that is shared between the internal and external networks.

In one embodiment, switch 110 is a VLAN-aware network switch capable of performing basic network processing operations, such as forwarding or rejecting data packets according to programmed rules, such as a load spreading configuration, at wire speed. In one embodiment, switch 110 includes layer 2 switch functionalities. Herein the term layer 2 refers to the data link layer in the Open Systems Interconnection (OSI) architecture. The OSI architecture, and the layers of the OSI architecture are well known to those of skill in the art and are not further described herein to avoid detracting from the description of the present invention.

As earlier described, typically, network switches forward packets to ports by matching information in the header of a data packet, such as source and destination addresses, against tables that tie addresses to ports. The switch chipsets are designed to perform these operations concurrently on all the ports at wire speed.

In one embodiment, switch 110 performs load spreading as part of layer 2 packet forwarding using programmable extensions of the switch chipset allowing load spreading to be performed at substantially the same speed and the same aggregated throughput as simple packet forwarding. In one embodiment, switch 110 uses programmable extensions of the data packet forwarding chipset to define a set of patterns used to match selected information in data packet headers and a set of load spreading rules that determine which data packets are dropped, rejected or forwarded to a particular port. An example of a switch chipset on which such extensions can used to implement load spreading is the Broadcom BCM 5692 (available from Broadcom Corporation, Irvine, Calif.).

In one embodiment, switch 110 includes one or more application program interfaces (APIs), herein termed load spreading control APIs, that permit a load spreading configuration, also termed the load spreading rules and filters, to be reconfigured from storage system 100, for example, from a node 102A-102n, to effect a desired load spreading. Thus, in the present embodiment, switch 110 does not monitor nodes 102A-102n, but rather exposes one or more load spreading control APIs through which the load spreading rules and filters, i.e., the load spreading configuration, in switch 110 are configured from storage system 100.

In one embodiment, switch 110 inspects the layer 2 header information of an incoming request, e.g., data packet, and utilizes selected information from the layer 2 header to redirect the request to a physical port based on the load spreading configuration, for example, set in an internal switching table (s) of switch 110 that determines which switch ports are associated with particular port addresses, for example, media access control (MAC) addresses of nodes 102A-102n. In one embodiment, switch 110 inspects the destination IP/port address, and the source IP/port address of the data packet header. One embodiment of a method of load spreading is further described herein with reference to FIG. 7.

FIG. 7 illustrates a process flow diagram of a method 700 implemented at switch 110 for distributing an incoming request to a peer node computer system based on a load spreading configuration in accordance with one embodiment of the present invention. In one embodiment, method 700 is part of switch 110 (as illustrated in FIG. 1) and implemented on incoming data traffic, e.g., requests, having client protocols which initiate a session to a known set of ports, such as TCP ports, on the cell VIP, for example, to a HTTP-based client API on a TCP port 8090, and NFS read clients on a TCP port 2049. In one embodiment, requests to other ports are sent to the master node, i.e., a node 102A-102n selected as a master node, to allow other services, such as file transfer protocol (FTP), to function on storage system 100. In FIG. 7, from an ENTER operation 702, processing transitions to a RECEIVE REQUEST operation 704.

In RECEIVE REQUEST operation 704, a request in the form of a data packet, such as an Ethernet data packet, is received at switch 110, and processing transitions to a DETERMINE APPLICATION TYPE operation 706.

In DETERMINE APPLICATION TYPE operation 706, switch 110 determines the application type of the incoming request by reading the layer 2 networking information available in the header of the data packet, such as the destination IP/port address. In one embodiment the destination IP/port address is compared against a listing of destination IP/port addresses approved for load spreading. A destination IP/port address matching an entry on the listing is determined as a request designated for load spreading, otherwise the request is not determined as a type designated for load spreading.

If the application type is not a type designated for load spreading, the request is forwarded to the appropriate processing node 102A-102n, such as the master node. Otherwise, if the application type is a type designated for load spreading, processing transitions from DETERMINE APPLICATION TYPE operation 706 to a COMPUTE HASH VALUE operation 708.

In COMPUTE HASH VALUE operation 708, a hash value is computed from the incoming request. In one embodiment, the hash value is computed from X least significant bits (LSB) of the source IP address and Y least significant bits (LSB) of the source port address, e.g., source MAC address, determined from the layer 2 network information available from the data packet header of the request. For example, if a client attempts to connect from:
   Source IP: 172.16/1/161
   Source port: 4434 and X=2 and Y=2, a hash value of fours bits is constructed with:
   Bit 0: 0 (Source port LSB 0)
   Bit 1: 1 (Source port LSB 1)
   Bit 2: 1 (Source IP LSB 0)
   Bit 3: 0 (Source IP LSB 1)

which equals:
   0110->decimal value 6.

In order to facilitate a balanced, e.g., substantially equal, load spreading of requests across all of nodes 102A-102n, in one embodiment, the total number of hash values is calculated as an integer multiple of the total number of nodes 102A-102n. In one embodiment, the total number of hash values=$2^{(X+Y)}$. Thus, in the present example, the total number of hash values is 16. From COMPUTE HASH VALUE operation 708, processing transitions to a SELECT NODE operation 710.

In SELECT NODE operation 710, a particular node 102A-102n is selected to receive the request based on the hash value of the request and the load spreading configuration present on switch 110. If the master node sets a load spreading configuration in which all nodes 102A-102n have equal weighting, e.g., equal probabilities of receiving a request, in one embodiment, the node 102A-102n to which the request is to be sent is computed by simply modding the hash value (determined in operation 708) with the number of currently active nodes 102A-102n:

node index=(hash value)mod(cell size), where cell size=number of available nodes 102A-102n in the cell. The resulting hash value or node index, determines the index into an array of the active nodes 102A-120n, and points to a particular node 102A-102n.

Alternatively, if the master node sets a load spreading configuration in which at least some nodes are unequally weighted, in one embodiment, a load spreading configuration that represents the weightings for each of the nodes 102A-102n is used. For example, in one embodiment, an array A of size S=the sum of the weights of all the nodes 102A-102n. The array A is populated such that each element of the array points to a node 102A-102n. The number of pointers to a node 102A-102n is equal to a node's weight. When a request arrives at switch 110, the hash value is computed (as earlier described in operation 708) and the node index in an array I=(hash value) mod S. The node 102A-102n selected is the node pointed to by A[I]. From SELECT NODE operation 710, processing transitions to a REDIRECT REQUEST TO SELECTED NODE operation 712.

In REDIRECT REQUEST TO SELECTED NODE operation 712, the request is transferred to the node 102A-102n selected in operation 710. In one embodiment, the request is sent unmodified to the selected node's corresponding switch port, and from REDIRECT REQUEST TO SELECTED NODE operation 712, processing transitions to an EXIT operation 714 with processing exiting method 700.

In an alternative embodiment, the load spreading configuration can be configured at switch 110 to forward only packets that match selected tuples (IP address, protocol, port) used by nodes 102A-102n and to drop, e.g., discard, or reject any other data packets (that do not match).

In one embodiment, a distributed load spreading software component running on one or more peer nodes 102A-102n monitors each of nodes 102A-102n and generates load spreading configurations. In one embodiment, the distributed software component is extensible as to how nodes 102A-102n are monitored and/or the method in which the load spreading is determined. In one embodiment, the load spreading software component is implemented as part of symmetric software application 104, and thus is present on each of nodes 102A-102n. In one embodiment, although the load spreading software component is executed on nodes 102A-102n, only the elected master node, for example node 102A, configures the load spreading configuration at switch 110. The other nodes, for example nodes 102B-102n, continue to monitor each other (and the master node), but the other nodes do not communicate a load spreading configuration to switch 110.

In one embodiment the master node maintains a cell view that includes information on which nodes 102A-102n are present in the cell and performance metrics of each node 102A-102n, including a load value. In one embodiment, each node 102A-102n publishes a load value, for example, to its mailbox, which can be read by all the other nodes 102A-102n, including the master node, on the internal VLAN. In one embodiment, the load value is a representation of the quantity of work, such as processing, being performed by a node 102A-102n. In one embodiment the load value is a numeric representation, however, in other embodiments, other representations can be used, such as alphabetic and alpha-numeric.

In one embodiment, the load value published by each node 102A-102n is based on load information maintained by each symmetric storage application 104.

In one embodiment, a load value is calculated by symmetric storage application 104 based on performance metrics published by interface module 304, disklet module 306, metadata module 308, object archive module 310, node management module 312, and/or core module 302. In one embodiment, each node management module 312 of each symmetric storage application 104 calculates a load value.

The master node analyzes the load values published by each node 102A-102n, and based on loading guidelines for the cell, the master node sends commands, e.g., calls selected load spreading control APIs, to switch 110 in order to adjust the load spreading of requests sent to the cell VIP, i.e., to reconfigure the load spreading configuration of switch 110. As the master node maintains all of the relevant states of nodes 102A-102n, the communications are one way: from the master node to switch 110 over the internal VLAN. A method for reconfiguring, also termed herein updating, the load spreading configuration on switch 110 is further described herein with reference to FIG. 8.

Figure 8:
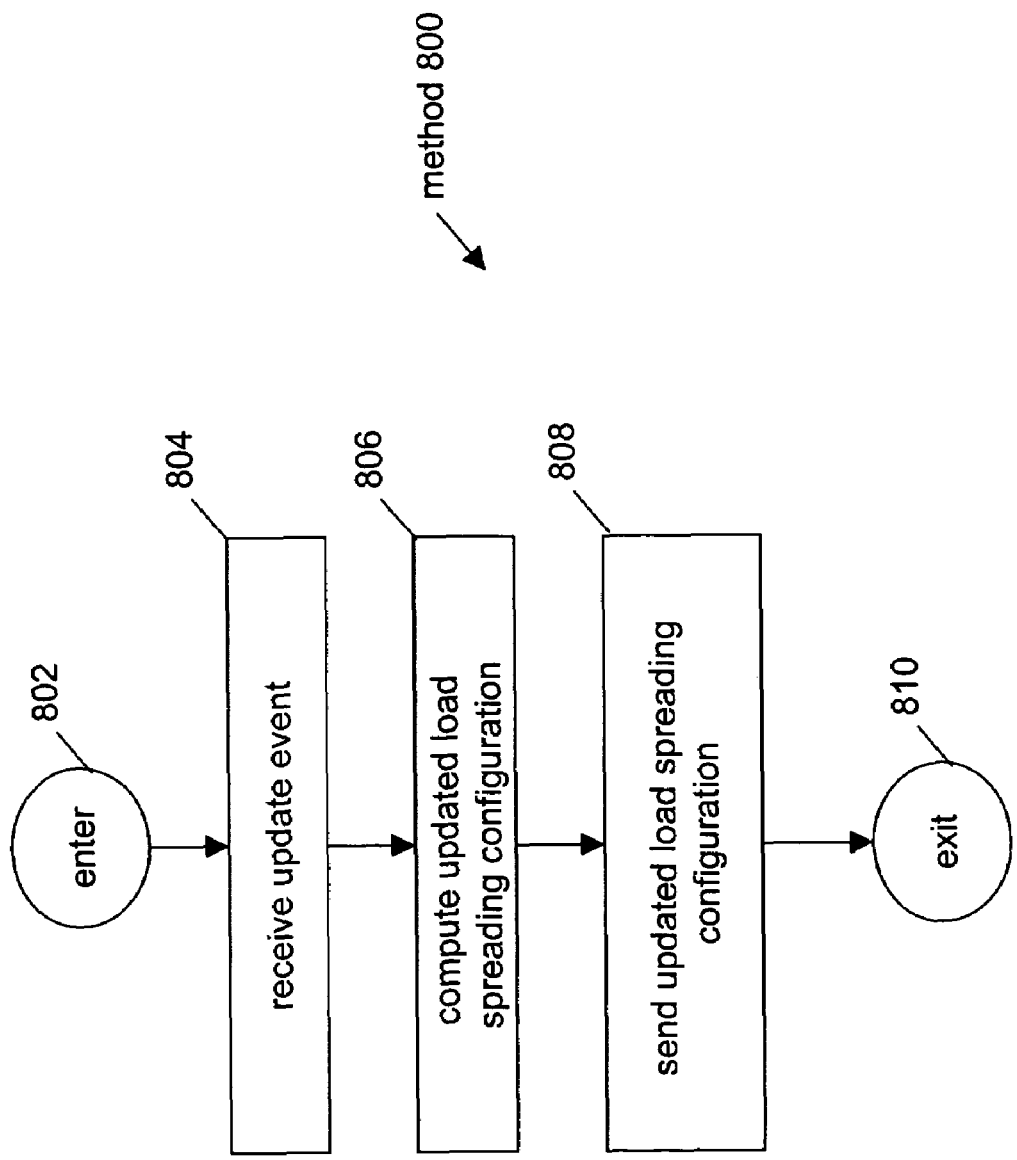
FIG. 8 illustrates a process flow diagram of a method for updating a load spreading configuration on a switch in accordance with one embodiment of the invention.

FIG. 8 illustrates a process flow diagram of a method 800 for updating a load spreading configuration on switch 110 in accordance with one embodiment of the invention. From an ENTER operation 802, processing transitions to a RECEIVE UPDATE EVENT operation 804.

In RECEIVE UPDATE EVENT operation 804, the master node receives, or otherwise determines or recognizes an update event. In one embodiment, an update event is a node membership event, e.g., a node joining or exiting the cell, or an event generated by a performance analysis performed by the master node on storage system 100, for example, an analysis of the load values published by each node 102A-102n.

In one embodiment, an update event generated by a node membership event occurs immediately, and an update event resulting from the analysis of cell performance metrics, i.e., an analysis of load values of nodes 102A-102n, occurs at a specified frequency, e.g., a specified time interval. From RECEIVE UPDATE EVENT operation 804, processing transitions to a COMPUTE UPDATED LOAD SPREADING CONFIGURATION operation 806.

In COMPUTE UPDATED LOAD SPREADING CONFIGURATION operation 806, the master node computes the desired load spreading weights, for example a percentage of incoming requests, for each node 102A-102n. As earlier described with reference to FIG. 7 and method 700, the master node can compute a desired load spreading configuration to effect equal or unequal load spreading of requests to nodes 102A-102n. From COMPUTE UPDATED LOAD SPREADING CONFIGURATION operation 806, processing transitions to a SEND UPDATED LOAD SPREADING CONFIGURATION operation 808.

In SEND UPDATED LOAD SPREADING CONFIGURATION operation 808, the master node calls a load spreading control API to set the updated load spreading configuration on switch 110. In one embodiment, the load spreading control API represents a generic layer used to hide the implementation details of the particular switch 110. Calls to this layer are translated to lower-level API calls specific to the switch implementation.

In one embodiment, two load spreading control APIs are used. The first load spreading control API, herein termed the set weights API, sets the load spreading properties for a range of ports, such as TCP ports, for the cell VIP, for example:
setweights (String vip, int[16] weights, int[ ] ports), where the argument definitions are:
vip=the virtual IP address upon which a filter of the switch acts;
weights=an array of integers, for example, 16, with values within a specified range, for example, from 0-100, for example, indicating the desired percentage of requests each node should receive. If a node is non-existent or down, the weight is 0. Each array index corresponds to a physical port on switch 110. For example, weights[0] corresponds to switch port 0, which corresponds to node 1, for example, node 102A. The master node maintains a mapping between each switch port and node 102A-102n; and
ports=array of port numbers, such as TCP port numbers, which the filter should act upon. For example: 8080, 1111, 2049.

In one embodiment, previous weight values sent to switch 110 are overwritten with each subsequent call to the set weights API. Until load spreading has been configured for a port on the cell VIP, all requests to that port are forwarded to the master node.

The second load spreading control API, herein termed the remove weights API, removes load spreading for a range of ports on a particular VIP:
remove Weights (String vip, Int[ ]ports), where the argument definitions are:
vip=the virtual IP address upon which a filter of switch 110 acts; and
ports=array of port numbers, such as TCP port numbers, which the filter should act upon. For example: 8080, 1111, 2049.

This causes all requests to the specified VIP port(s) to be sent to the master node only. From SEND UPDATED LOAD SPREADING CONFIGURATION operation 808, processing transitions to an EXIT operation 810, with processing exiting method 800, and transitioning to a method 900 implemented at switch 110 as further described herein with reference to method 900 and FIG. 9.

FIG. 9 illustrates a process flow diagram of a method 900 for updating a load spreading configuration by switch 110 in accordance with one embodiment of the invention. From an ENTER operation 902, processing transitions to a RECEIVE UPDATED LOAD SPREADING CONFIGURATION operation 904.

In RECEIVE UPDATED LOAD SPREADING CONFIGURATION operation 904, switch 110 receives the updated load spreading configuration sent by the master node over the internal VLAN using a load spreading control API (operation 808, FIG. 8), and processing transitions from RECEIVE UPDATED LOAD SPREADING CONFIGURATION operation 904 to an UPDATE LOAD SPREADING CONFIGURATION operation 906.

In UPDATE LOAD SPREADING CONFIGURATION operation 906, the load spreading configuration, for example, a switching table, present at switch 110 is reconfigured to implement the updated load spreading configuration sent from the master node. In one embodiment, the load spreading control API makes corresponding private API calls communicate from the master node over the internal network with a daemon on switch 110, herein termed the switch daemon. The switch daemon reconfigures the load spreading configuration of switch 110 to implement the updated load spreading configuration computed by the master node. From UPDATE LOAD SPREADING CONFIGURATION operation 906, processing transitions to an EXIT operation 908 with processing exiting from method 900.

Thus, as described above incoming requests to storage system 100 are load spread among nodes 102A-102n in accordance with a load spreading configuration at switch 110. Switch 110 receives a request and determines whether to redirect the request in accordance with a load spreading configuration. If the request is to be redirected in accordance with the load spreading configuration, a hash value of the request is computed and used as node index to a load spreading configuration, such as a weighted array, to select a node 102A-120n to receive the request.

In one embodiment, the load spreading configuration on switch 110 is updatable, e.g., reconfigurable, from storage system 100, and in particular by a master node of storage system 100. In one embodiment, the master node receives an update event, computes an updated load spreading configuration, and sends the updated load spreading configuration to switch 110 utilizing load spreading control APIs. Switch 110 receives the updated load spreading configuration and updates an existing load spreading configuration with the updated load spreading configuration, for example, by overwriting an existing load spreading configuration with the updated load spreading configuration.

Other than the load spreading control API(s) used in programming (and updating) the load spreading configuration on switch 110, the present invention does not require additional configuration software on switch 110. As switch 110 does not modify addresses in the data packets, switch 110 can be implemented as a layer 2 switch rather than a more sophisticated layer 4 switch with an integrated firewall. Further, as data packets are accepted or rejected during standard layer 2 processing, access control can be implemented at wire-speed.

In one embodiment, symmetric storage system application 104 can be configured as a computer program product. Herein a computer program product comprises a medium configured to store or transport computer-readable instructions, such as program code for symmetric storage system application 104, including all, any, or parts of processes described herein with reference to FIGS. 1-9, or in which computer-readable instructions for symmetric storage system application 104, including all, any, or parts of processes described herein with reference to FIGS. 1-9 are stored. Some examples of computer program products are CD-ROM discs, ROM cards, floppy discs, magnetic tapes, computer hard drives, servers on a network and signals transmitted over a network representing computer-readable instructions. Further herein, a means for performing a particular function is accomplished using the appropriate computer-readable instructions and the related hardware necessary to perform the function.

The foregoing description of implementations of the invention have been presented for purposes of illustration and description only, and, therefore, are not exhaustive and do not limit the invention to the precise forms disclosed. Modifications and variations are possible in light of the above teachings or can be acquired from practicing the invention. Consequently, Applicants do not wish to be limited to the specific embodiments shown for illustrative purposes.

What is claimed is:

1. A method for distributing an incoming request to one of a plurality of peer node computer systems of a distributed storage system, the method comprising:

receiving a request at a switch, the switch including a load spreading configuration, wherein the load spreading configuration is a weighted array, the load spreading configuration being reconfigurable by one of the plurality of peer node computer systems, the request including a header, the header including a destination port address, a source IP address, and a source port address;

determining whether the request is to be distributed to one of the plurality of peer node computer systems in accordance with the load spreading configuration by determining an application type of the request and determining whether the application type identifies the request as a request to be distributed in accordance with the load spreading configuration;

upon a determination that the request is to be distributed to one of the plurality of peer node computer systems in accordance with the load spreading configuration, computing a hash value from the request, the hash value being computed, at least in part, by determining a number of least significant bits of the source IP address, determining a number of least significant bits of the source port address, and computing the hash value utilizing the number of least significant bits of the source IP address and the number of least significant bits of the source port address;

selecting a peer node computer system in accordance with the load spreading configuration based on the application type and the hash value; and redirecting the request to the peer node computer system.

2. The method of claim 1, wherein the switch is a layer 2 network switch.

3. The method of claim 1, wherein determining an application type of the request comprises:

determining the destination port address, the destination port address identifying an application type of the request.

4. The method of claim 1, wherein selecting a peer node computer system of the plurality of peer node computer systems to receive the request utilizing the hash value further comprises:

determining a cell size, wherein the cell size is a total number of the plurality of peer node computer systems in the data storage system;

computing a node index, wherein the node index=(hash value) mod(cell size); and selecting the peer node computer system in accordance with the load spreading configuration utilizing said node index.

5. A method for distributing an incoming request to one of a plurality of peer node computer systems of a distributed storage system, the method comprising:

receiving a request at a switch, the switch including a load spreading configuration, wherein the load spreading configuration is an equally weighted array, the load spreading configuration being reconfigurable by one of the plurality of peer node computer systems, the request including a header, the header including a destination port address, a source IP address, and a source port address;

determining whether the request is to be distributed to one of the plurality of peer node computer systems in accordance with the load spreading configuration by determining an application type of the request and determining whether the application type identifies the request as a request to be distributed in accordance with the load spreading configuration;

upon a determination that the request is to be distributed to one of the plurality of peer node computer systems in accordance with the load spreading configuration, computing a hash value from the request, the hash value being computed, at least in part, by determining a number of least significant bits of the source IP address, determining a number of least significant bits of the source port address, and computing the hash value utilizing the number of least significant bits of the source IP address and the number of least significant bits of the source port address;

selecting a peer node computer system in accordance with the load spreading configuration based on the application type and the hash value; and redirecting the request to the peer node computer system.

6. The method of claim 5, wherein the switch is a layer 7 network switch.

7. The method of claim 5, wherein determining an application type of the request comprises:

determining the destination port address, the destination port address identifying an application type of the request.

8. The method of claim 5, wherein selecting a peer node computer system of the plurality of peer node computer systems to receive the request utilizing the hash value further comprises:

determining a cell size, wherein the cell size is a total number of the plurality of peer node computer systems in the data storage system;

computing a node index, wherein the node index=(hash value) mod(cell size); and selecting the peer node computer system in accordance with the load spreading configuration utilizing said node index.

9. A method for distributing an incoming request to one of a plurality of peer node computer systems of a distributed storage system, the method comprising:

receiving a request at a switch, the switch including a load spreading configuration, wherein the load spreading configuration is an weighted array and the weighted array is unequally weighted, the load spreading configuration being reconfigurable by one of the plurality of peer node computer systems, the request including a header, the header including a destination port address, a source IP address, and a source port address;

determining whether the request is to be distributed to one of the plurality of peer node computer systems in accordance with the load spreading configuration by determining an application type of the request and determining whether the application type identifies the request as a request to be distributed in accordance with the load spreading configuration;

upon a determination that the request is to be distributed to one of the plurality of peer node computer systems in accordance with the load spreading configuration, computing a hash value from the request, the hash value being computed, at least in part, by determining a number of least significant bits of the source IP address, determining a number of least significant bits of the source port address, and computing the hash value utilizing the number of least significant bits of the source IP address and the number of least significant bits of the source port address;

selecting a peer node computer system in accordance with the load spreading configuration based on the application type and the hash value; and redirecting the request to the peer node computer system.

10. The method of claim 9, wherein the switch is a layer 2 network switch.

11. The method of claim 9, wherein determining an application type of the request comprises:

determining the destination port address, the destination port address identifying an application type of the request.

12. The method of claim 9, wherein selecting a peer node computer system of the plurality of peer node computer systems to receive the request utilizing the hash value further comprises:

determining a cell size, wherein the cell size is a total number of the plurality of peer node computer systems in the data storage system;

computing a node index, wherein the node index=(hash value) mod(cell size); and selecting the peer node computer system in accordance with the load spreading configuration utilizing said node index.

\* \* \* \* \*

UNITED STATES PATENT AND TRADEMARK OFFICE
CERTIFICATE OF CORRECTION

PATENT NO.        : 7,536,693 B1
APPLICATION NO.   : 10/883321
DATED             : May 19, 2009
INVENTOR(S)       : Olaf Manczak, Michael Goff and Patrick Gates Page 1 of 1

It is certified that error appears in the above-identified patent and that said Letters Patent is hereby corrected as shown below:

In Column 19, Line 19, Claim 6, replace "layer 7" with --layer 2--.

Signed and Sealed this

Seventh Day of July, 2009

JOHN DOLL
*Acting Director of the United States Patent and Trademark Office*